United States Patent [19]
Ettischer

[11] 3,903,537
[45] Sept. 2, 1975

[54] DUAL LENS CAMERA

[75] Inventor: Helmut Ettischer, Stuttgart, Germany

[73] Assignee: Eastman Kodak Company, Rochester, N.Y.

[22] Filed: June 10, 1974

[21] Appl. No.: 477,582

[30] Foreign Application Priority Data
June 14, 1973  Germany............................ 2330267

[52] U.S. Cl............................... 354/197; 354/268
[51] Int. Cl.².......................................... G03B 3/00
[58] Field of Search........................... 354/197, 268

[56] References Cited
UNITED STATES PATENTS
2,687,669  8/1954  Bolsey................................. 354/268
3,388,650  6/1968  Westphalen........................ 354/197

*Primary Examiner*—John M. Horan
*Attorney, Agent, or Firm*—R. F. Brothers

[57] ABSTRACT

A camera includes a pair of lenses of different focal lengths alternately movable into axial alignment with the camera's exposure aperture. The longer focal length lens is focusable and the shorter focal length lens is fixed focus. Focus adjusting means for the longer focal length lens is disconnected from that lens and is covered or made inaccessible to the operator when the shorter focal length lens is in the taking position. Means are provided to prevent camera operation when the selected lens has not been properly aligned in the camera's optical axis.

5 Claims, 2 Drawing Figures

DUAL LENS CAMERA

BACKGROUND OF THE INVENTION

1. Field of the Invention

The present invention relates to cameras having a plurality of interchangeable lenses which can be selectively brought into the taking position.

2. Description of the Prior Art

Cameras having two or more lenses of different focal lengths which are arranged in an adjustable carrier, such as a rotary turret or a slider, are known. Some of these cameras have lenses with fixed focus while others may provide for axial adjustment of the lenses to adjust the focus of the selected lens.

Of course, those cameras having fixed focus lenses are limited in use to situations where the photographic subject is within the acceptable range of the camera. Even in such situations, the results are often a compromise in that the image, while perhaps acceptable to many amateur photographers, will be slightly out of focus at most subject distances from the film plane. Cameras having adjustable focus lenses do not present this problem, but in those cameras the operator must adjust the focus with each exposure regardless of the lens used.

It is known that short focal length lenses have a longer depth of field than long focal length lenses. That is, proper focus is less critical with a short focal length lens than with a long focal length lens. Therefore, cameras which provide for the setting of focus for all lenses, regardless of focal length, have been found to be more complicated in operation and more expensive than necessary for the average amateur photographer.

SUMMARY OF THE INVENTION

Accordingly, it is an object of the present invention to provide a camera of the type having interchangeable lenses of different focal lengths with a mechanism which will permit focus adjustment of the longer focal length lens while incorporating a fixed focus short focal length lens. This permits accurate focusing of the longer focal length lens, such accurate focusing being more critical when using such lenses, while illiminating the need for focusing the short focal length lens, which will produce acceptable results without adjustment.

In keeping with the above object, the illustrated embodiment of a camera according to the present invention includes a pair of interchangeable lenses of different focal lengths. The short focal length lens is fixed focus and the long focal length lens is axially movable. Focus means are provided for adjusting the axial position of the long focal length lens, the focus means being disconnected or uncoupled from that lens when the short focal length lens is in the taking position. in order to prevent confusion by the operator, the focus means is covered and made inaccessible when it is uncoupled from the long focal length lens.

Because, in the use of cameras having interchangeable lenses, the operator may fail to properly align a lens with the camera's optical axis, I have provided a mechanism for preventing camera operation in the event that the lens is not properly positioned.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
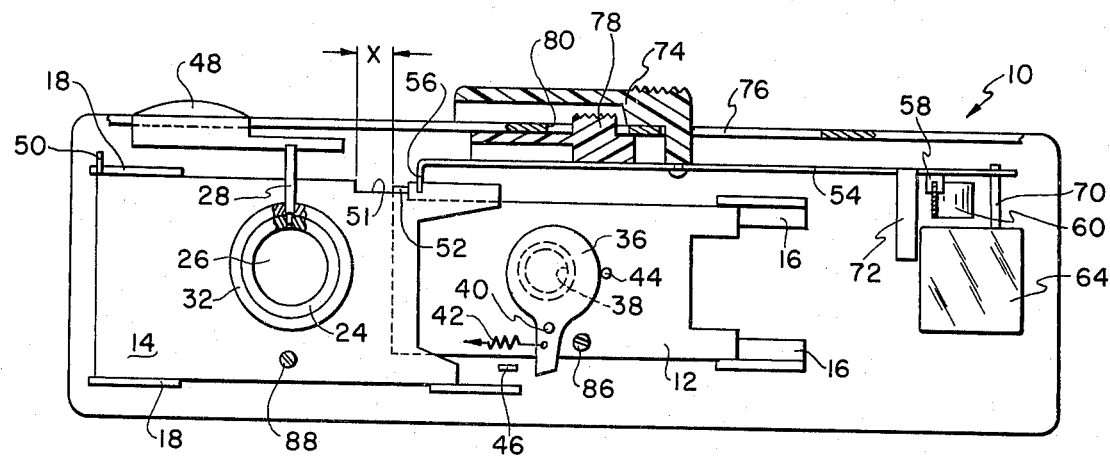
FIG. 1 is a front view partially in section showing a camera in accordance with the present invention.

Because cameras are well known, the present description will be directed in particular to elements forming part of, or cooperating more directly with, apparatus in accordance with the present invention. It is to be understood that camera elements not specifically shown or described may take various forms well known to those skilled in the art.

Referring to the drawings, which are not necessarily to scale, a camera 10 has a pair of lens carriers 12 and 14 slidably mounted in guides 16 and 18, respectively, for lateral movement parallel to the film plane. Lens carrier 12 has a mount 20 which holds a lens 22, and carrier 14, which lies toward the front of the camera, carries a mount 24 with a lens 26. Lenses 22 and 26 may, of course, be formed of more than one element.

A focusing pin 28 is attached to mount 24 and projects through a slot 30 in a lens tube 32. In the illustrated embodiment, lens 22 is a standard taking lens and lens 26 is a telephoto lens. However, lenses 22 and 26 may be of any power, and it is contemplated only that lens 22 be of shorter focal length than lens 26.

While lens 26 is free to move axially in tube 32, the axial position of lens 22 has been set at the factory and lens 22 is fixed-focus.

Between lens carriers 12 and 14, a shutter plate 34 carries a shutter blade 36 and has an exposure aperture 38. The shutter plate is not shown in FIG. 1 for purposes of clarity. Shutter blade 36 is biased about a pin 40 into abutment with a stop 44 by tension spring 42. A shutter release lever 46 is movable to the right as viewed in FIG. 1 to momentarily open the shutter in a manner well known in the art when a shutter release button 48 is depressed.

Mount 14 carries a blocking lug 50 and has a recess 51 into which an arm 52 extends from lens carrier 12. A sliding plate 54 has a bent-off portion 56 which engages a groove in lens mount 14. Sliding plate 54 has a pair of legs 58 and 59, leg 58 being connected to an overcenter snap spring 60 above a viewfinder cavity 62. The viewfinder cavity houses front and rear elements 64 and 66 and an adjustable element 68. Element 68 is connected to leg 59 of sliding plate 54 by a pin 70. A leg 72 projects downwardly from sliding plate 54 to serve as a warning signal in the viewfinder as will be later described.

A selector member 74 is integrally adapted to sliding plate 54. This member is L-shaped and projects through an opening 76 in the camera housing.

A focus member 78 projects through an opening 80 in the camera housing and has an indicator nose 82 which aligns with a focusing scale on the camera housing. Focusing member 78 has an angular slot 84 which opens downwardly and is adapted to receive pin 28 when the telephoto lens is moved into the camera's optical axis.

Each of lens carriers 12 and 14 has an adjusting screw 86 and 88, respectively, by means of which the plane of the lens carrier can be adjusted parallel to the film plane. Further, adjustable stops 90 and 92 are provided for limiting the displacement path of the lens carriers so that the respective lenses are aligned with the camera's optical axis when in their taking positions.

OPERATION

Figure 2:
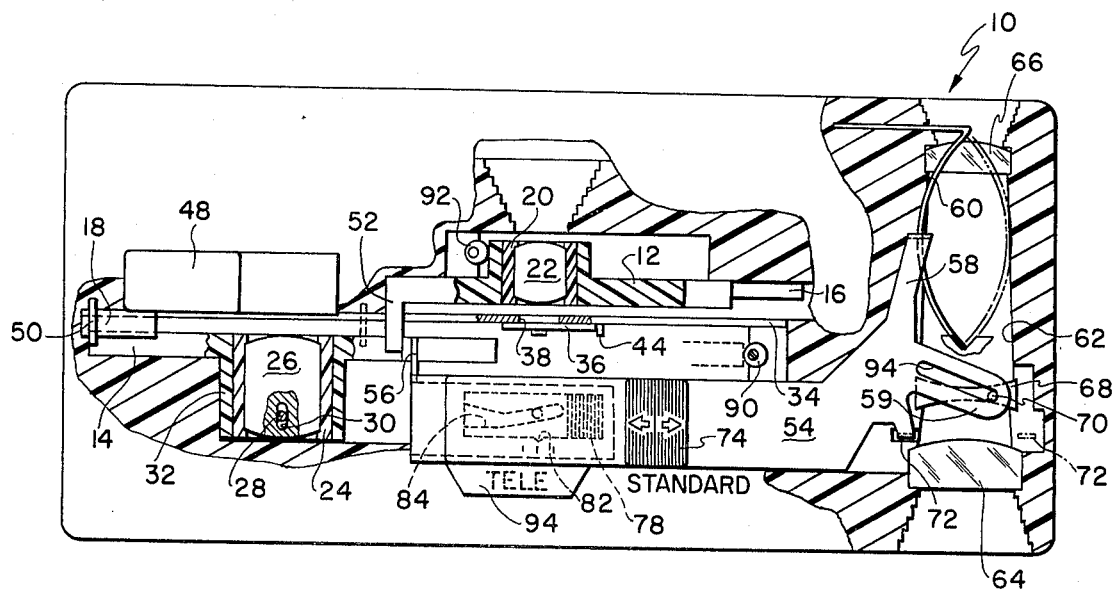
FIG. 2 is a plan view partially in section of the camera shown in FIG. 1.

In FIGS. 1 and 2, the camera is shown in its "standard" state. Short focal length lens 22 is in axial alignment with exposure aperture 38 while long focal length lens 26 is in a stored position. The word "standard" printed on the camera housing is visible to the operator while the abbreviation "tele" is covered by a projection 94 on selector member 74.

In order to change the focal length of the camera, actuating member 74 is manually moved to the right as viewed in the drawings. The abbreviation "tele", focusing member 78 and the distance scale are thereupon revealed while the word "standard" is covered by tab 94. Bent portion 56 of sliding plate 54 draws lens carrier 14 to the right while lens carrier 12 remains stationary until lens carrier 14 has moved a distance X and tab 52 is contacted by the edge of recess 51, whereupon lens carrier 12 moves with lens carrier 14. During this displacement, overcenter spring 60 snaps over to carry sliding plate 54 and lens carrier 14 to a position aligning long focal length lens 26 with exposure aperture 38 to hold lens carrier 14 against stop 90.

As sliding plate 54 moves to the right, pin 70 on viewfinder lens element 68 follows slot 94 to change the field of the viewfinder to correspond with the image at the film plane.

As telephoto lens 26 is brought into the optical axis, focusing pin 28 enters angular slot 84 of focusing slider 78. Now, displacement of the focusing slider along the scale provided causes telephoto lens 26 to be displaced axially by pin 28 riding along slot 84.

When either lens 22 or lens 26 is in axial alignment with the exposure aperture, blocking lug 50 is out of the path of travel of shutter release lever 48 and warning lug 72 on sliding plate 54 is not in viewfinder cavity 62. If the sliding member 54 is in an intermediate position, blocking lug 50 will prevent depression of the shutter release lever and warning lug 72 will appear in the viewfinder.

To change from telephoto to wide angle, selector member 74 is moved to the left, immediately moving lens carrier 14 with it. After lens carrier 14 has moved a distance X, the trailing edge of recess 51 contacts tab 52 and brings along lens carrier 12. Overcenter snap spring 60 now acts upon sliding plate 54 to urge the sliding plate to the left and to hold lens carrier 12 against stop 92.

The invention has been described in detail with particular reference to a preferred embodiment thereof, but it will be understood that variations and modifications can be effected within the spirit and scope of the invention.

I claim:

1. A camera having means defining an exposure aperture, said camera comprising:
   a fixed-focus lens movable into and out of axial alignment with said exposure aperture;
   an adjustable-focus lens having a first degree of freedom for movement into and out of axial alignment with said exposure aperture and a second degree of freedom for movement axially to adjust the focus;
   focus means for adjusting the axial position of said adjustable-focus lens; and
   a selector member operatively connected with said lenses for selectively moving one lens into or out of axial alignment with said exposure aperture while moving the other lens respectively out of or into axial alignment with said exposure aperture, wherein said selector member includes means for covering said focus means when said fixed-focus lens is in axial alignment with said exposure aperture, whereby said focus means is inaccessible.

2. A camera having means defining an exposure aperture, said camera comprising:
   a fixed-focus lens movable into and out of axial alignment with said exposure aperture;
   an adjustable-focus lens having a first degree of freedom for movement into and out of axial alignment with said exposure aperture and a second degree of freedom for movement axially to adjust the focus;
   a selector member operatively connected with said lenses for selectively moving one lens into and out of axial alignment with said exposure aperture while moving the other lens respectively out of or into axial alignment with said exposure aperture;
   a manually movable focus member; and
   means operatively connecting said focus member and said adjustable-focus lens when said adjustable-focus lens is in axial alignment with said exposure aperture for adjusting the axial position of said adjustable-focus lens as said focus member is moved, said focus member being disconnected from said adjustable-focus lens when said fixed-focus lens is in axial alignment with said exposure aperture.

3. A camera as defined in claim 2 wherein said selector member includes means for covering said focus member when said fixed-focus lens is in axial alignment with said exposure aperture, whereby said focus member is inaccessible.

4. A camera having means defining an exposure aperture, said camera comprising:
   first and second lenses alternately movable into and out of axial alignment with said exposure aperture, said first lens being axially movable to adjust its focus;
   focus means for adjusting the axial position of said first lens; and
   coupling means for operatively interconnecting said focus means and said first lens when said first lens is in axial alignment with said exposure aperture and for disconnecting said first lens and said focus means when said second lens is in axial alignment with said exposure aperture.

5. A camera as defined in claim 4 wherein said focus means includes a manually movable focus member and further comprising a selector member operatively connected with said lenses for moving said lenses into and out of axial alignment with said exposure aperture, said selector member having means for covering said focus member when said second lens is in axial alignment with said exposure aperture.

* * * * *